(12) United States Patent
Song et al.

(10) Patent No.: US 7,509,581 B1
(45) Date of Patent: Mar. 24, 2009

(54) VIDEO BROWSER BASED ON CHARACTER RELATION

(75) Inventors: Jung Min Song, Seoul (KR); Jin Soo Lee, Seoul (KR)

(73) Assignee: LG Electronics, Inc., Seoul (KR)

( * ) Notice: Subject to any disclaimer, the term of this patent is extended or adjusted under 35 U.S.C. 154(b) by 145 days.

(21) Appl. No.: 09/645,613

(22) Filed: Aug. 25, 2000

(30) Foreign Application Priority Data

Aug. 26, 1999 (KR) ............................... 1999-35688

(51) Int. Cl.
    *G06F 3/00* (2006.01)
(52) U.S. Cl. ..................... 715/721; 715/719; 715/720; 715/722
(58) Field of Classification Search ................. 345/704, 345/716, 717, 718, 723, 724, 719; 715/719, 715/720, 722, 723–726, 716, 853, 854; 725/37, 725/44, 46, 47, 53
    See application file for complete search history.

(56) References Cited

U.S. PATENT DOCUMENTS

| | | | |
|---|---|---|---|
| 5,574,845 A | 11/1996 | Benson et al. | |
| 5,821,945 A * | 10/1998 | Yeo et al. | 345/440 |
| 5,956,026 A | 9/1999 | Ratakonda | |
| 5,982,364 A | 11/1999 | Beckwith | |
| 6,169,547 B1 * | 1/2001 | Tanaka et al. | 345/838 |
| 6,236,395 B1 | 5/2001 | Sezan et al. | |
| 6,278,446 B1 * | 8/2001 | Liou et al. | 715/700 |
| 6,323,911 B1 * | 11/2001 | Schein et al. | 348/552 |
| 6,400,996 B1 * | 6/2002 | Hoffberg et al. | 700/83 |
| 6,469,711 B2 * | 10/2002 | Foreman et al. | 715/723 |
| 6,492,998 B1 | 12/2002 | Kim et al. | |
| 6,546,188 B1 * | 4/2003 | Ishii et al. | 386/52 |
| 6,602,297 B1 | 8/2003 | Song | |
| 6,608,633 B1 * | 8/2003 | Sciammarella et al. | 345/700 |
| 6,611,277 B1 * | 8/2003 | Miyazaki | 345/861 |
| 6,629,097 B1 * | 9/2003 | Keith | 707/5 |
| 6,678,689 B2 | 1/2004 | Yoon et al. | |
| 2007/0157225 A1 * | 7/2007 | Harada et al. | 725/23 |

* cited by examiner

*Primary Examiner*—Simon Ke
(74) *Attorney, Agent, or Firm*—Sidley Austin LLP

(57) ABSTRACT

A video data structure and a video browser for video browsing based on content is disclosed. An embodiment of the present invention allows users to easily understand relationships between characters and changes in relationships between characters in a movie or drama by displaying significant events in connection to corresponding relationships and by displaying character relationships in a tree structure.

24 Claims, 7 Drawing Sheets

VIDEO BROWSER BASED ON CHARACTER RELATION

BACKGROUND OF THE INVENTION

1. Field of the Invention

The present invention relates to a video browser, and more particularly to a video browser for browsing a video based on relations between characters.

2. Background of the Related Art

Typically, users simply view movies and/or dramas as broadcasted through a TV or played at a movie theatre. However, a user may wish to view a particular movie or drama at a particular time, or wish to view only a particular section of a movie or a drama. Accordingly, various techniques which enables a selective watching of a movie/drama or sections of a movie/drama have been suggested.

In the related art, for example, various video data may be represented or classified into format portion, index portion, media portion, segment portion, target portion, and/or representation portion. Also, data on various characters or objects such as a name of an object, position on the screen, numeric data with relation to a segment of the video data in which the object appears, may be represented by the target and representation portion. Accordingly, a user can select an object through a table and reproduce for display a particular segment where the object is shown in the video.

In other related art, various additional data of a video data are obtained before, during or after the production of the video data. Thereafter, an additional information table of the obtained data is composed and provided to users. Namely, the additional data table may include a position where an actor appears, a position where a character of the actor appears, and a position where stage properties appear, such that a scene can be reproduced as selected by a user through the additional data table. For example, if a user selects a stage property, information on the selected stage property such as the manufacturer and price may be displayed on a screen, and the user may be able connect with the manufacturer or a seller of the stage property through a network connection.

In still other related art, recording information on each segment of a video in a video map has been suggested. That is, information such as the degree of violence, the degree of adult contents, the degree of importance of contents, characters positions, and the degree of difficulty in understanding may be indicated for each segment of a video in the video map. Thus, the user may set a degree of preference for one or more items of the video map, and only segments of the video meeting the set degree of preference would be reproduced, thereby limiting a display of particular contents to unauthorized viewers.

Similarly, other techniques in the related art as described above provide items simply arranged without any relation to the objects appearing in the movie or drama, based upon the selection of the user. However, the contents of a movie or drama generally build around relations between characters, places and events. For example, relations between characters may not change from beginning to the end of the story or may continuously vary. Moreover, since one or more characters can relate to a specific character in the movie or drama, the browsing method in the related art substantially fails to provide an accurate understanding of the story of the movie or drama to the user.

Therefore, techniques in the related arts have disadvantages in that it is difficult to understand a video centering on relations among characters according to the development of events, changes of relations, and relations among characters and places as events develop.

SUMMARY OF THE INVENTION

Accordingly, an object of the present invention is to solve at least the problems and disadvantages of the related art.

Another object of the present invention is to provide a video browser in which event segments showing changes in relations between characters are summarized and displayed based on a video data structure which includes characters in a video that significantly act on development of an event, and includes a constant and variable relations between characters.

A still another object of the present invention is to provide a video browser in which main events that significantly act on variable relations between characters are connected with corresponding variable relations based on a video data structure which includes characters in a video that significantly act on development of an event, and includes a constant and variable relations between characters.

A further object of the present invention is to provide a video browser in which a key frame of event segments which show a corresponding relation between characters is displayed based on a video data structure which includes characters in a video that significantly act on development of an event, and includes a constant and variable relations between characters.

A further object of the present invention is to provide a video browser in which a constant relation and changes in relations between characters are displayed depending on pre-set relation types based on a video data structure which includes characters in a video that significantly act on development of an event, and includes a constant and variable relations between characters.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a video browsing system for browsing a video based on a data structure in which a constant and variable relations between characters of a video are connected with characters and corresponding event segments, comprises (a) browsing and displaying a video segment showing a constant relation between characters and variable relations between characters based on an event segment showing a corresponding constant relation and variable relation, and (b) displaying a video segment of a corresponding event segment in response to a user's selection.

The video browser of the present invention is characterized in that event segments showing a constant relation between characters and changes in the relations is summarized and displayed. Also, main events that significantly act on variable relations are connected with corresponding variable relations and characters.

Moreover, the video browser of the present invention is characterized in that constant relation and variable relation between the characters are browsed and displayed as a constant relation and a variable relation between characters selected by the user. The constant relation and variable relation between characters may also be browsed and displayed as a constant relation and a variable relation between every characters related with a selected character.

In still another video browser of the present invention, the constant relation and variable relation between characters are displayed in a tree structure. The video browser of the present invention may display a constant relation and variable relation between characters depending on preset relation types. The relation types may be set in semantic types such as 'family relation,' 'business relation,' and 'social relation'.

Furthermore, the video browser of the present invention is characterized in that event segments showing constant relation and variable relation between characters is displayed as a key frame. Finally, the key frame may show a corresponding relation between characters.

BRIEF DESCRIPTION OF THE DRAWINGS

The present invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1:
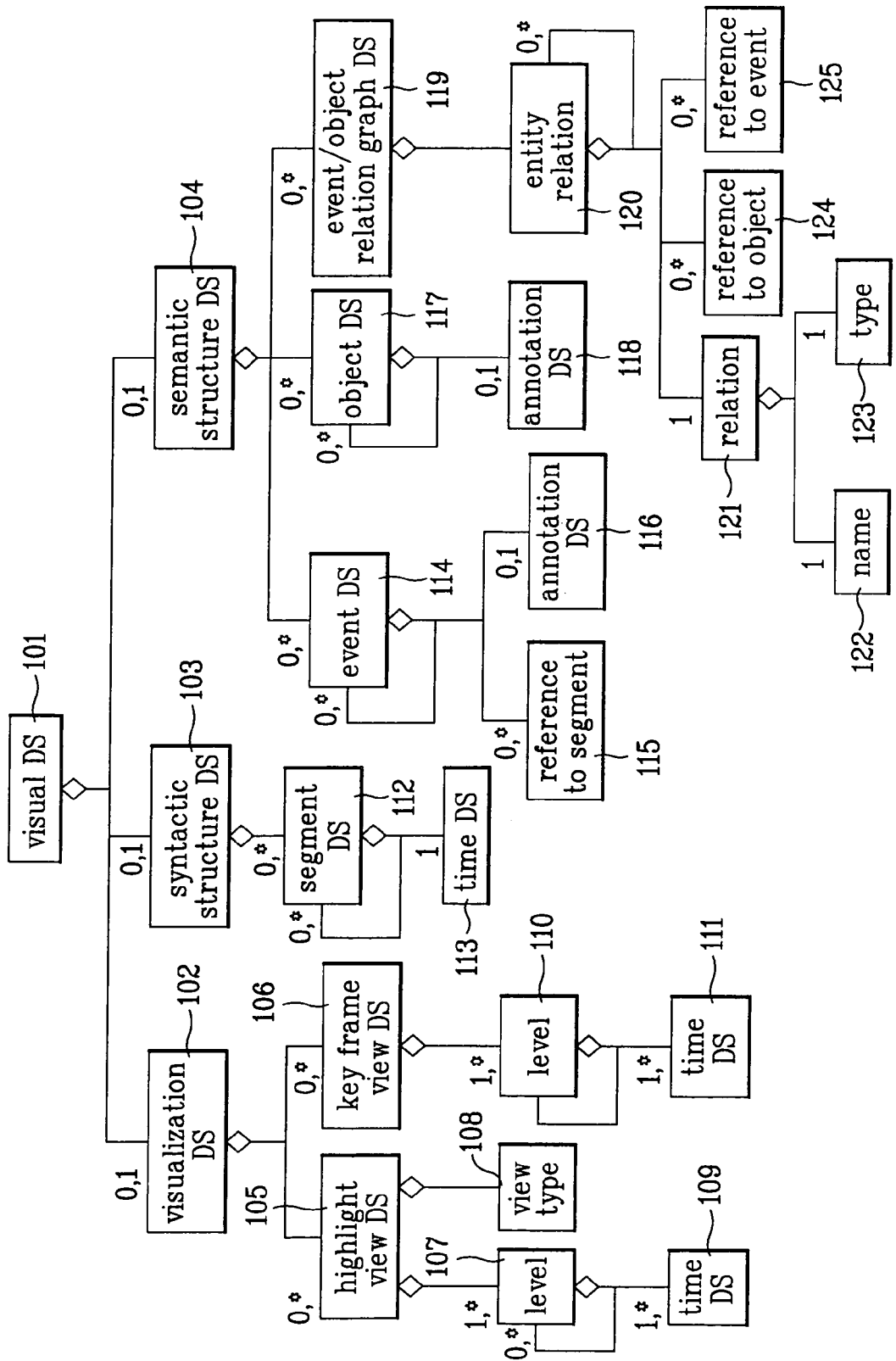
FIG. 1 shows an example of a video data structure based on character relation according to the present invention.

FIG. 1 shows a video data structure based on character relations in accordance with the present invention for a video browser based on content. A video browser based on content is disclosed in U.S. patent application Ser. No. 09/239,530 (now U.S. Pat. No. 6,602,297), entitled "Motional Video Browsing Data Structure and Browsing Method Therefor," which is fully incorporated herein by reference.

Referring to FIG. 1, a visual description scheme (DS) 101 is divided into a visualization DS 102, a syntactic structure DS 103, and a semantic structure DS 104. The visualization DS 102 is organized into a highlight view DS 105 for displaying a summarized data as a video highlight, and a key frame view DS 106 for displaying summarized data based on a key frame. Because, a video plot can be summarized briefly or with greater amounts of detail, the highlight view DS 105 enables a display of multi-levels of summarized data with a level 107, a view type 108 and a time DS 109. Similarly, the key frame view DS 106 enables a display of multi-levels of summarized data with a level 110 and a time DS 111.

Namely, the highlight view DS 105 is organized into a level 107, which has multiple levels of highlight data based upon a degree of detail in summarizing a video. In such case, summary data in each level may include a corresponding period in the time DS 109 for use in highlight. The key frame view DS 106 is also organized into a level 110 which has multiple levels of summarized data based upon a degree of detail. In such case, summary data in each level may include a corresponding period in the time DS 111 for use as a key frame.

The syntactic structure DS 103 is used for displaying the actual video and includes actual video segments to be displayed. The syntactic structure DS 103 is organized into actual video segments in segment DSs 112, and corresponding temporal positions of video segments in the time DS 113.

The semantic structure DS 104 includes additional information describing a video, and is organized into an event DS 114 including event information, an object DS 117 including object information, and an event/object relation graph DS 119 including information describing relations between objects and places, and corresponding events to the relations. Namely, the event DS 114 describes events, and the object DS 117 describes objects such as characters and places. The event/object relation graph DS 119 describes a constant relation or changes in relation between characters, a relation between object and place, or a relation between object and event.

Here, a constant relation means either a relation between characters that cannot change throughout a video, such as a parent to child relation, or a relation which is most representative of the relations between characters.

When an event is selected to display a video segment corresponding to the event, the event DS 114 of the semantic structure DS 104 is used. The event DS 114 is divided into a Reference to Segment 115 including information necessary for displaying a segment of a video corresponding to the selected event and an annotation DS 116 including information which connects events with actual positions of the events in a video and information for explaining events in a video. Particularly, the event DS 114 is used in displaying a selected event and connects the selected event with a position of the event in a video data through the Reference to Segment 115, and the contents of a selected event is annotated through the annotation DS 116.

The object DS 117 is organized into an object annotation DS 118 including information for describing objects such as characters or places. That is, the object DS 117 is used in displaying characters, and detailed information of the characters can be summarized or annotated through the annotation DS 118

The event/object relation graph DS 119 includes information on a constant relation and variable relation between characters. The event/object relation graph DS 119 is organized into an entity relation 120 with a return which allows a display of character relations in a tree structure in which a relation may have subordinate relations. According to the present invention, constant relations between characters are placed in an upper level of the tree while changes of relations between the characters are placed in a lower level of the tree.

The entity relation 212 is also divided into a relation 121, a Reference to Object 124, and a Reference to Event 125. The relation 121 is organized into a name 122 including information on the titles of relations, and a type 123 including information on the nature of relations. For example, a nature of relation may be 'family' and a title of relation may be 'spouse.' The Reference to Object 124 connects related characters with each other and the Reference to Event 125 connects events which shows particular relations.

In the above video data structure, the notation above each data such as {0,1}, {0,*}, or {1,*} indicates the number of data for the corresponding data. For example, the notation of {0,1} for the visualization DS 102 indicates that the visual DS 101 can have zero or one visualization DS. On the other hand, the notation of {0,*} for the segment DS 112 indicates that the syntactic structure DS 103 may have from zero to any number of segment DS.

Figure 2:
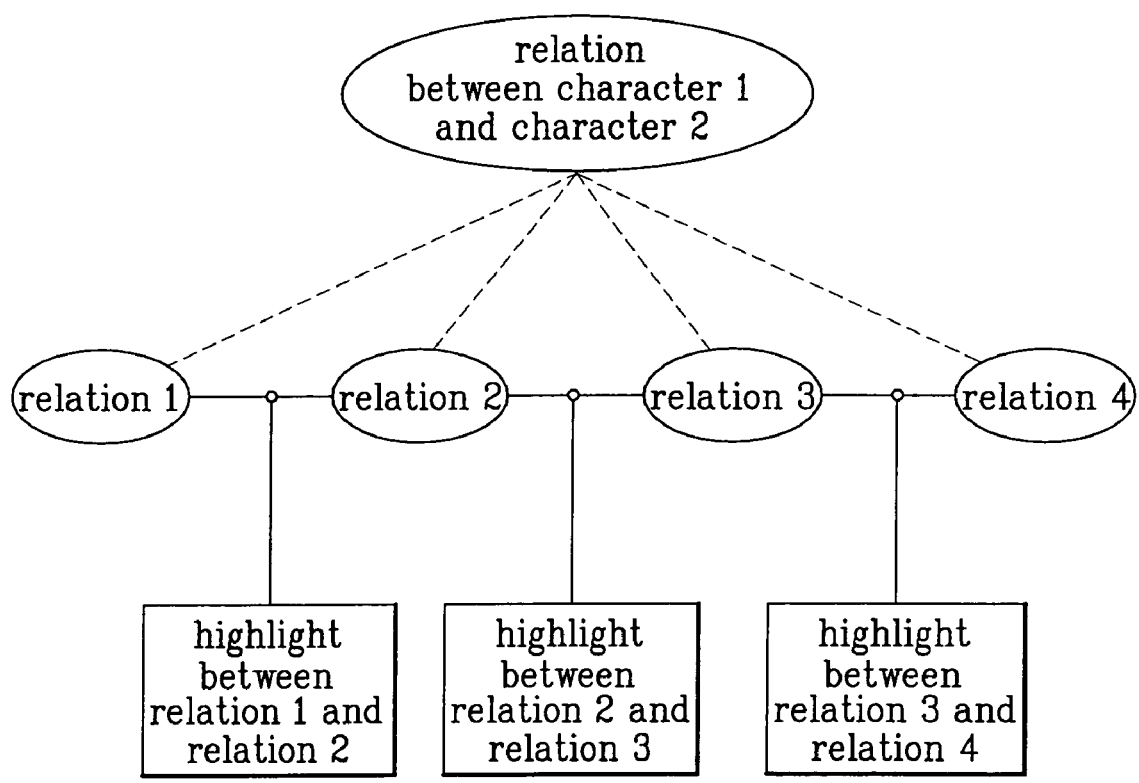
FIG. 2 shows an example of a video data structure in which events showing character relations are summarized in accordance to the present invention.

FIG. 2 shows a method of using a data structure of FIG. 1 to easily understand and browse a video based on a relations between characters. Referring to FIG. 2, a representative relation (constant relation) between 'character 1' and 'character 2' is placed at the top of the tree structure, and variable relations (relation 1~relation 4) between 'character 1' and 'character 2' are placed at the bottom of the tree structure. Also, main events which are significant in a change of relation in a variable relation are placed between variable relations. The main events are summarized video data and are displayed by highlight data.

Here, the events are connected through the Reference to Event 125 in the entity relation 120 and the video segments are connected through the Reference to Segment 115 in the event DS 114. Thereafter, an actual video segment is displayed by connecting the time DS 113 of the segment DS 112 with the time DS 109 of the level 107 in the highlight DS 105 of the visual DS 102.

Figure 3:
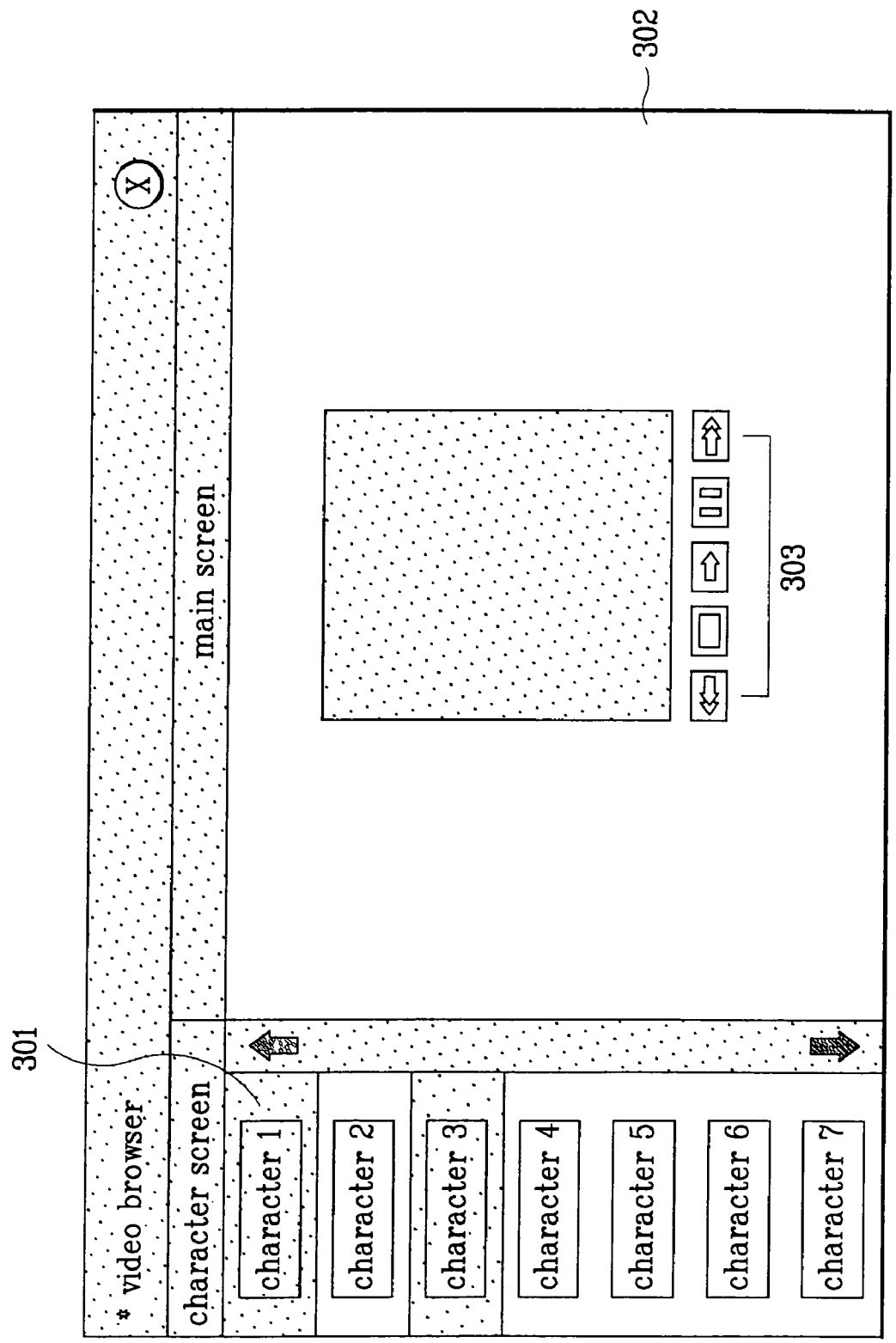
FIG. 3 shows a video browser based on the video data structure of FIG. 2.

FIG. 3 shows an example screen of a video browser based on the video data structure of FIG. 2. Referring to FIG. 3, 'character n' of a video is displayed on a character screen 301, and a video is displayed on a main screen 302 according to a selection received through a user interface 303.

For example, if a user selects 'character 1' and 'character 3' from the character screen 301, main events which are significant in bringing about a change in the variable relations between 'character 1' and 'character 3' can be browsed based on the data structures of FIGS. 1 and 2. As a result, contents corresponding to the main events are summarized and displayed on the main screen 302.

Figure 4:
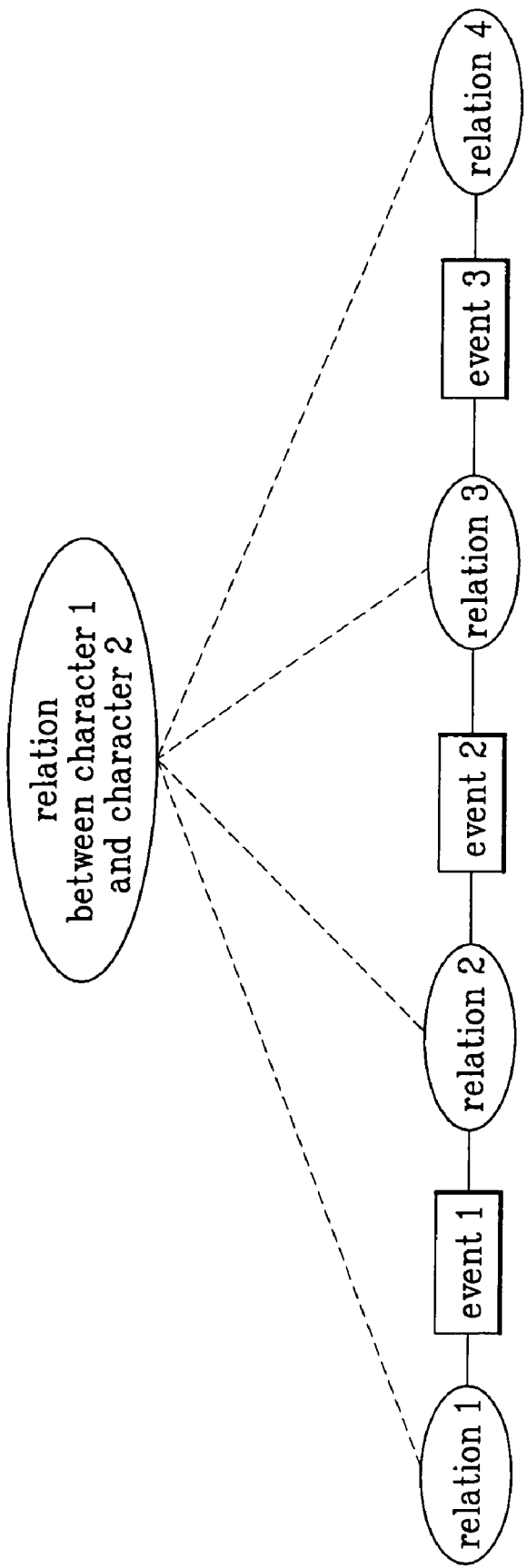
FIG. 4 shows a video data structure of an event segment showing variable relations between characters.

FIG. 4 shows another method of using a video data structure including information on variable relations of characters and main events significant in the variable relations.

Referring to FIG. 4, a representative relation (constant relation) between 'character 1' and 'character 2' is placed at a top of a tree structure, and variable relations (relation 1~relation 4) between 'character 1' and 'character 2' are placed at the bottom of the tree structure. Main events (event 1~event 3) which are significant in bringing about a change in the variable relations are placed between the variable relations. The method of FIG. 4 is realized in such a manner that a main event segment which brings a new relation is connected with the variable relations through the Reference to Event 125 of the entity relation 120.

Figure 5:
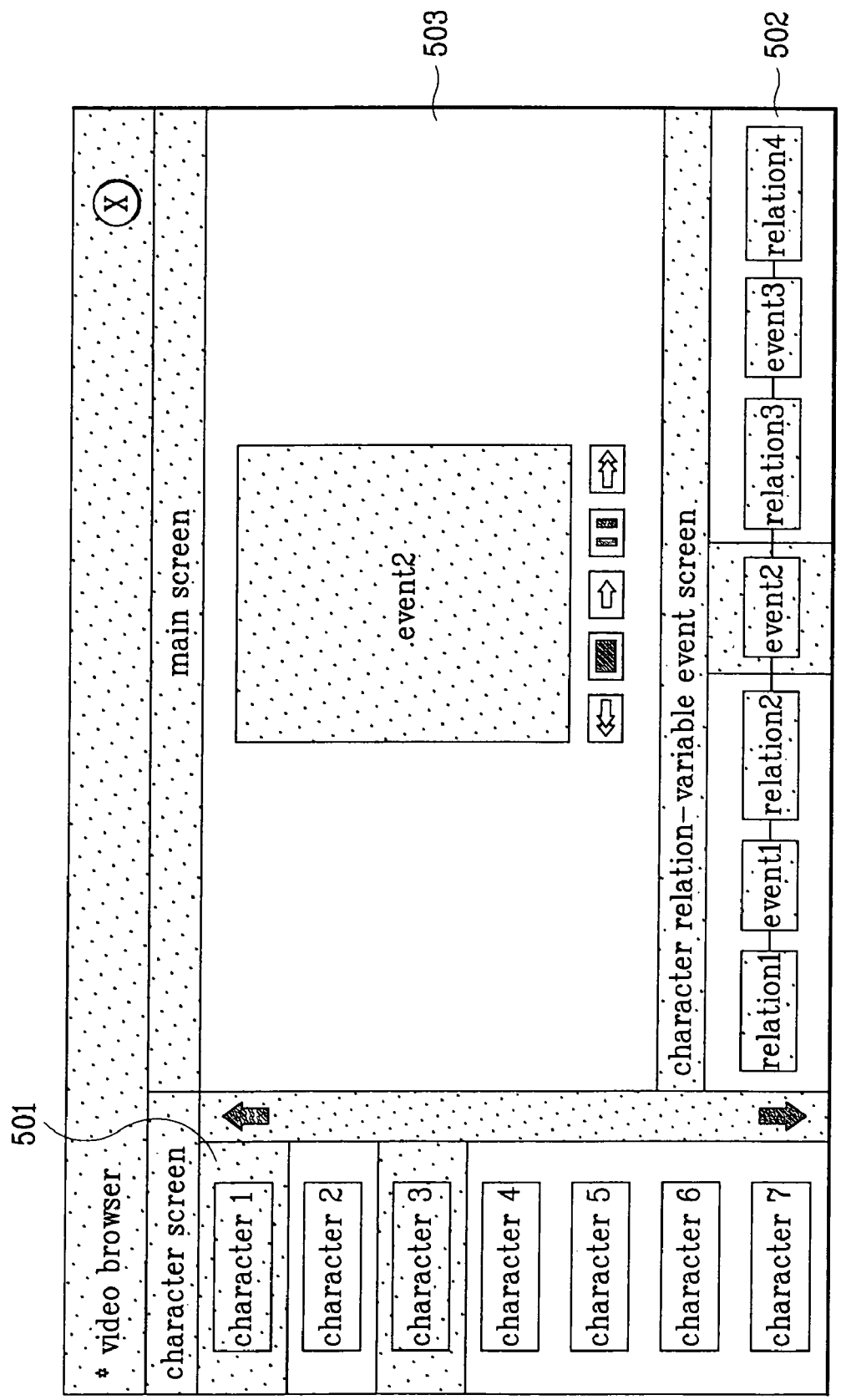
FIG. 5 shows a video browser based on the data structure of FIG. 4 in accordance with the present invention.

FIG. 5 shows a video browser in accordance with the present invention based on the data structure of FIG. 4. Referring to FIG. 5, characters in a video are displayed on a character screen 501, and connection between variable relations and events are displayed on a character relation-variable event screen 502. Also, an event segment corresponding to a variable relation can be reproduced and displayed on a main screen 503.

For example, if a viewer selects 'character 1' and 'character 3,' variable relations between 'character 1' and 'character 3,' and main events which are significant in bringing about a change in the variable relation are respectively displayed on the screen 502. At this time, a relation or event may be displayed by a key frame or annotation. Also, a video segment corresponding to an event such as 'event 2' selected from the screen 502 is reproduced and displayed on the main screen 503.

Figure 6:
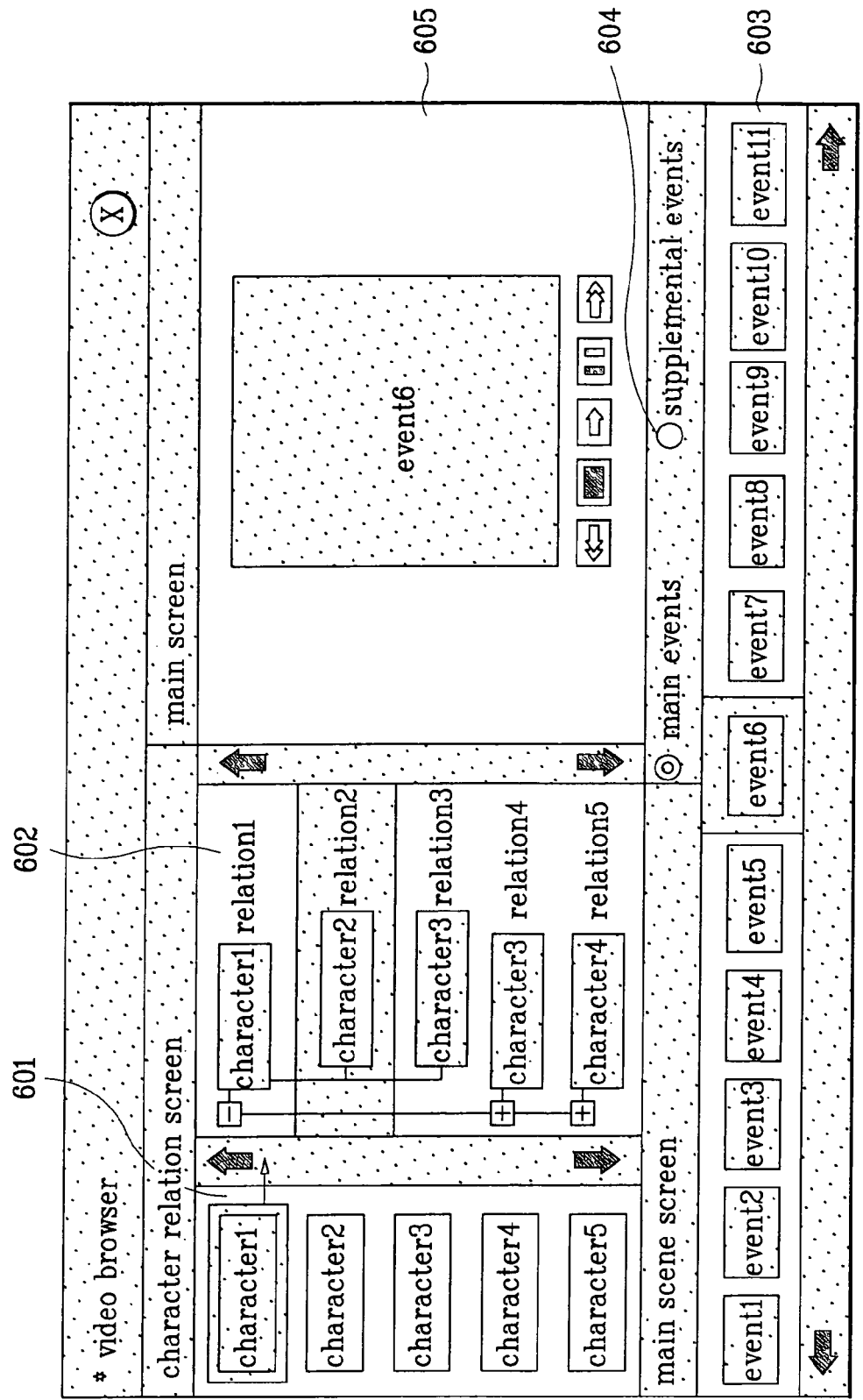
FIG. 6 shows an example of a video browser according to the present invention.

FIG. 6 shows another example screen of a video browser according to the present invention. Referring to FIG. 6, main characters of a video are displayed on a character screen 601. Also, characters having relations with a character selected from the character screen 601, and a constant relation and variable relations between the selected character and related characters are displayed on a relation screen 602.

At this time, a constant relation between the selected character and a related character is displayed on the top of a relation tree structure while variable relations between the selected character and the related character is displayed on the bottom of the tree structure.

Furthermore, a key frame of events significant in both the constant relation and variable relations is displayed on a main scene screen 603. Here, key frames of event segment corresponding to a type(s) of event may be displayed on the main scene screen according to a user selection through a selection screen 604. Namely, key frames of main event segments, which directly show a selected relation or key frames of secondary event segments, which indirectly show the selected relation, or both can be displayed according to the user selection. For example, if a selected relation is a husband and wife, a main event segment may be a video segment of a marriage ceremony while a secondary event segment may be a video segment of third parties discussing the marriage ceremony. An event segment corresponding to an event, for example a key frame, selected from the main scene screen 603 can thus be reproduced and displayed on the main screen 605.

For example, when a user selects 'character 1' from among the characters in the character screen 601, other characters 'character 2'~'character 4' related with 'character 1' are displayed on the relation screen 602. If 'relation 2' with 'character 2' is selected from the relation screen 602, event segments corresponding to 'relation 2' with 'character 2' is displayed on the main scene screen 603 as key frames. Also, a period of a video corresponding to 'event 6' selected from the main scene screen 603 is reproduced and displayed on the main screen 605.

At this time, the video browser of FIG. 6 can be implemented by setting a relation type in the data structure of FIG. 1. In other words, events connected with a relation may vary depending on whether the type 123 of the relation 121 is the direct or indirect type as discussed above. Also, the events are connected through the Reference to Event 125 of the entity relation 120 and event segments are connected through the Reference to Segment 115 of the event DS 114. Thereafter, an actual video segment is displayed by connecting the time DS 113 of the segment DS 112 with the time DS 111 of the level 110 in the key frame view DS 106 of the visual DS 102.

Figure 7:
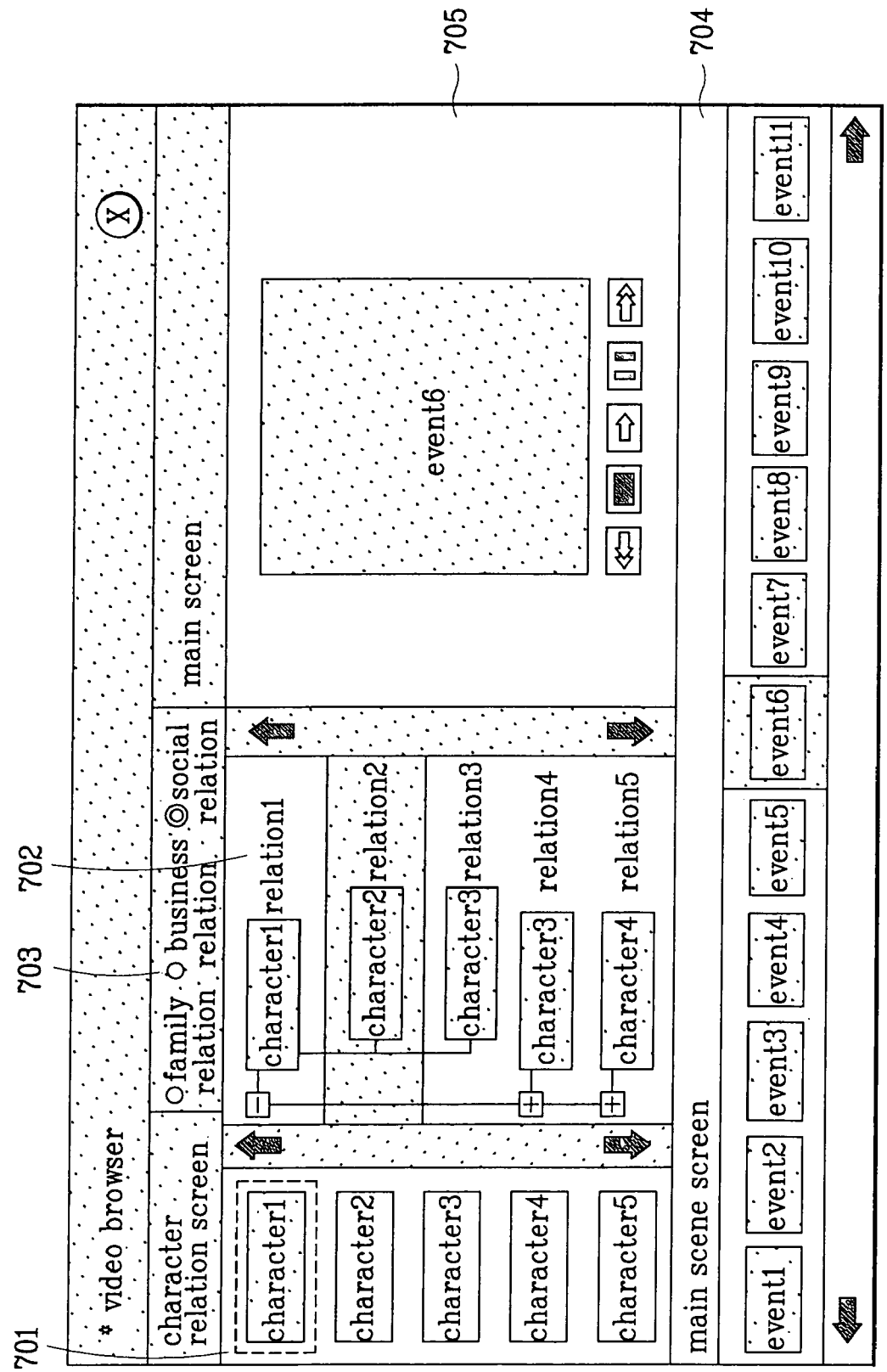
FIG. 7 shows another example of a video browser according to the present invention.

FIG. 7 shows still another example screen of a video browser according to the present invention. Referring to FIG. 7, characters of a video are displayed on a character screen 701; and character having relations with a selected character, and a constant relation and a variable relation between the selected character and related characters are displayed on a relation screen 702. Here, the constant and variable relations may categorized into different natures of relations and relations corresponding to a particular nature(s) of relation selected through a selection screen 703 may be displayed in the relation screen. The nature of relation may be a family relation, a business relation, or a social relation.

Thus, a key frame of events significant in the selected nature(s) of relation is displayed on a main scene screen 704. A video segment corresponding to the selected relation and event is reproduced and displayed on a main screen 705. For example, when a user selects 'character 1' from characters displayed on the character screen 701, characters ('character 2'~'character 4') having a social relation with 'character 1' may be displayed and an event segment of 'event 6' corresponding to 'social relation 2' with 'character 2' can be reproduced and displayed on the main screen 705.

As in FIG. 6, a constant relation between a selected character and a related character is displayed on the top of a relation tree structure while variable relations between the selected character and the related character is displayed on the bottom of the tree structure. The video browser of FIG. 7 can be realized by setting a relation type 123 of the relation data 121 in the data structure of FIG. 1. In other words, events related with the relation data 121 may vary depending on whether the relation type 123 of the relation data 121 is a 'family relation,' a 'business relation,' or a 'social relation.' As a result, browsing of FIG. 7 can be performed. At this time, the events are mutually connected through the reference to event 125 of the real relation 120. Segments are mutually connected through the reference to segment 115 of the event DS 114. Then, the time DS 113 of the segment DS 112 is connected with the time DS 111 of the level 107 displayed in the key frame DS 106 of the visual DS 102.

As aforementioned, the video browser based on a character relation according to the present invention has the following advantages. The event periods of the variable relation between the characters are summarized and displayed, and the main events concerned in the variable relation between the characters are connected between the variable relations and then displayed.

Furthermore, the data structure for browsing a video is based on a relation between characters and a variable relation between them. A key frame of an event period showing a corresponding relation between the characters clearly or directly, or a key frame of an event period showing it with hint or indirectly can be displayed based on the data structure. Also, the relations between the characters are divided into a family relation, a social relation, and an emotion relation to be selectively provided to a user, so that video browsing can be performed based on the relations between the characters.

Accordingly, contents of the video can be browsed based on characters that significantly act on development of a story of a movie or drama, the relation between the characters, and the variable relation between them. After all, the user can easily browse the video based on characters, event and relation which are concerned in development of a story and important for contents of a real video. Also, the user can understand and browse a desired video in various types based on the video data structure which represents characters and their relation.

Furthermore, the present invention may be applied to a VOD system in the broadcasting field so that the user can view a desired part. This could lead to an advantage that the user can reproduce and view the desired part within short time and to effective utilization of the network source. Also, the present invention may be applied to a video player for home use and a broadcasting video player so that the video browsing environment can be provided to easily browse a desired part of a movie or drama stored in the video player.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for processing multimedia data, the apparatus comprising:
    a memory; and
    a processor configured to perform operations comprising:
        receiving segment information about an audio-visual program, the segment information including segment location information identifying a plurality of audio-visual segments in the audio-visual program, wherein the segment location information defines each audio-visual segment by a temporal position in a multimedia stream of the audio-visual program and wherein each audio-visual segment represents a continuous temporal content portion in the audio-visual program;
        generating a hierarchical data structure configured to facilitate browsing content in the audio-visual program, the hierarchical data structure including a first structural part which stores the segment information and a distinct second structural part which stores segment group information defining first and second segment groups for the audio-visual program, each of the first and second segment groups defining a respective set of non-contiguous audio-visual segments which are selected from the plurality of audio-visual segments and identified in the segment group information by references to the corresponding segments in the segment information of the audio-visual program, wherein said segment group information specifies a respective group type and a respective duration for each of said first and second segment groups, the respective group types indicating that the first and second segment groups represent respective first and second content summaries related to objects or events as depicted in the audio-visual program, and wherein the segment group information includes segment order information defining that (i) the audio-visual segments within the first segment group are ordered relative to each other according to a time sequence that is significant for the first content summary's representation of the corresponding events or objects in the audio-visual program and (ii) the audio-visual segments within the second segment group are not ordered relative to each other according to any time sequence that is significant for the second content summary's representation of the corresponding events or objects in the audio-visual program; and
        storing the hierarchical data structure including the segment information and the segment group information in the memory.

2. The apparatus of claim 1, wherein said segment group information includes a level information.

3. The apparatus of claim 2, wherein said level information defines multiple levels.

4. The apparatus of claim 1, wherein said segment location information defines each audio-visual segment contained in the first and second segment groups by a respective start time and a respective segment duration.

5. The apparatus of claim 1, wherein the respective group types for the first and second segment groups specify that the first and second segment groups are related to at least two characters represented in the content of the multimedia stream.

6. The apparatus of claim 5, wherein the first segment group includes audio-visual segments representing time ordered relation changes between the at least two characters.

7. The apparatus of claim 5, wherein the audio-visual segments within the second segment group include audio-visual segments representing constant relations between the at least two characters.

8. The apparatus of claim 1, wherein the segment group information indicates that the first segment group includes audio-visual segments that represent highlights from the multimedia stream.

9. A method implemented by an apparatus for processing multimedia data, the method comprising:
    generating segment information about an audio-visual program as a first structural part of a hierarchical data structure configured to facilitate browsing content in the audio-visual program, the segment information including segment location information identifying a plurality of audio-visual segments in the audio-visual program, wherein the segment location information defines each audio-visual segment by a temporal position in a multimedia stream of the audio-visual program and wherein each audio-visual segment represents a continuous temporal content portion in the audio-visual program;
    generating segment group information as a distinct second structural part of the hierarchical data structure configured to facilitate browsing content in the audio-visual program; and
    transmitting said segment information and said segment group information to a client,
    wherein said segment group information:
        defines first and second segment groups for the audio-visual program, each of which defines a respective set of non-contiguous audio-visual segments which are selected from the plurality of audio-visual segments and identified in the segment group information by references to the corresponding segments in the segment information of the audio-visual program;
        specifies a respective group type and a respective duration for each of said first and second segment groups, the respective group types indicating that the first and second segment groups represent respective first and second content summaries related to objects or events as depicted in the audio-visual program; and
        includes segment order information defining that (i) the audio-visual segments within the first segment group are ordered relative to each other according to a time sequence that is significant for the first content summary's representation of the corresponding events or objects in the audio-visual program and (ii) the audio-visual segments within the second segment group are not ordered relative to each other according to any time sequence that is significant for the second content summary's representation of the corresponding events or objects in the audio-visual program.

10. The method of claim 9, wherein said segment group information includes a level information.

11. The method of claim 10, wherein said level information defines multiple levels.

12. The method of claim 9, wherein the segment location information defines a respective start time and a respective segment duration for each audio-visual segment contained in the first and second segment groups.

13. An apparatus for processing multimedia data, the apparatus comprising:
    a memory; and
    a processor configured to perform operations comprising:
        receiving segment information about an audio-visual program, the segment information including segment location information identifying a plurality of audio-visual segments in the audio-visual program, wherein segment location information defines each audio-visual segment by a temporal position in a multimedia stream of the audio-visual program and wherein each audio-visual segments represents a continuous temporal content portion in the audio-visual program;
        receiving segment group information defining first and second segment groups for the audio-visual program;
        generating a hierarchical data structure configured to facilitate browsing content in the audio-visual program, the hierarchical data structure including a first structural part which stores the received segment information and a distinct second structural part which stores the segment group information, wherein each of the first and second segment groups define a respective set of non-contiguous audio-visual segments which are selected from the plurality of audio-visual segments and identified in the segment group information by references to the corresponding segments in the segment information of the audio-visual program, wherein said segment group information specifies a respective group type and a respective duration for each of said first and second segment groups, the respective group types indicating that the first and second segment groups represent respective first and second content summaries related to objects or events as depicted in the audio-visual program, and wherein the segment group information includes segment order information defining that (i) the audio-visual segments within the first segment group are ordered relative to each other according to a time sequence that is significant for the first content summary's representation of the corresponding events or objects in the audio-visual program and (ii) the audio-visual segments within the second segment group are not ordered relative to each other according to any time sequence that is significant for the second content summary's representation of the corresponding events or objects in the audio-visual program; and
        storing the hierarchical data structure including the segment information and the segment group information in the memory.

14. The apparatus of claim 13, wherein said segment group information includes a level information.

15. The apparatus of claim 14, wherein said level information defines multiple levels.

16. The apparatus of claim 13, wherein the segment location information defines each audio-visual segment contained in the first and second segment groups by a respective start time and a respective segment duration.

17. A method implemented by an apparatus for processing multimedia data, the method comprising:
    receiving segment information about an audio-visual program, the segment information including segment location information identifying a plurality of audio-visual segments in the audio-visual program, wherein the segment location information defines each audio-visual segment by a temporal position in a multimedia stream of the audio-visual program and wherein each audio-visual segment represents a continuous temporal content portion in the audio-visual program;
    receiving segment group information from a provider; and
    storing said received segment information and said segment group information in distinct first and second structural parts of a hierarchical data structure configured to facilitate browsing content in the audio-visual program in a client, wherein said segment group information:
        defines first and second segment groups for the audio-visual program, each of which defines a respective set of non-contiguous audio-visual segments that are selected from the plurality of audio-visual segments and identified in the segment group information by references to the corresponding segments in the segment information of the audio-visual program;

specifies a respective group type and a respective duration for each of said first and second segment groups, the respective group types indicating that the first and second segment groups represent respective first and second content summaries related to objects or events as depicted in the audio-visual program; and includes segment order information defining that (i) the audio-visual segments within the first segment group are ordered relative to each other according to a time sequence that is significant for the first content summary's representation of the corresponding events or objects in the audio-visual program and (ii) the audio-visual segments within the second segment group are not ordered relative to each other according to any time sequence that is significant for the second content summary's representation of the corresponding events or objects in the audio-visual program.

18. The method of claim 17, wherein said segment group information includes a level information.

19. The method of claim 18, wherein said level information defines multiple levels.

20. The method of claim 17, wherein the segment location information defines each audio-visual segment contained in the first and second segment groups by a respective start time and a respective segment duration.

21. A storage medium storing a hierarchical data structure configured to be processed by multimedia data processing apparatus to facilitate browsing content in an audio-visual program, the stored hierarchical data structure comprising:

a first structural part which stores segment information about the audio-visual program, the segment information including segment location information identifying a plurality of audio-visual segments in the audio-visual program, wherein the segment location information defines each audio-visual segment by a temporal position in a multimedia stream of the audio-visual program and wherein each audio-visual segment represents a continuous temporal content portion in the audio-visual program;

a distinct second structural part which stores segment group information defining first and second segment groups for the audio-visual program, each of which defines a respective set of non-contiguous audio-visual segments that are selected from the plurality of audio-visual segments and identified in the segment group information by references to the corresponding segments in the segment information of the audio-visual program, wherein said segment group information specifies a respective group type and a respective duration for each of said first and second segment groups, the respective group types indicating that the first and second segment groups represent respective first and second content summaries related to objects or events as depicted in the audio-visual program, and wherein the segment group information includes segment order information defining that (i) the audio-visual segments within the first segment group are ordered relative to each other according to a time sequence that is significant for the first content summary's representation of the corresponding events or objects in the audio-visual program and (ii) the audio-visual segments within the second segment group are not ordered relative to each other according to any time sequence that is significant for the second content summary's representation of the corresponding events or objects in the audio-visual program.

22. The storage medium of claim 21, wherein said segment group information includes a level information.

23. The storage medium of claim 22, wherein said level information defines multiple levels.

24. The storage medium of claim 21, wherein the segment location information defines a respective start time and a respective segment duration for each audio-visual segment contained in the first and second segment groups.

* * * * *